(12) United States Patent
Heider et al.

(10) Patent No.: US 12,269,712 B2
(45) Date of Patent: Apr. 8, 2025

(54) HUMAN AND/OR NON-HUMAN CARGO ATTACHMENT DEVICE FOR USE WITH A ROTORCRAFT

(71) Applicant: AIRBUS HELICOPTERS DEUTSCHLAND GMBH, Donauworth (DE)

(72) Inventors: Christoph Heider, Rain Am Lech (DE); Dominik Vogel, Langweid (DE); Stefan Salzburger, Augsburg (DE); Alexandru Dinca, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 255 days.

(21) Appl. No.: 17/987,943

(22) Filed: Nov. 16, 2022

(65) Prior Publication Data
US 2023/0183044 A1    Jun. 15, 2023

(30) Foreign Application Priority Data
Dec. 15, 2021    (EP) ..................................... 21400024

(51) Int. Cl.
*B66C 1/36* (2006.01)
*B64D 1/22* (2006.01)
*B64C 27/00* (2006.01)

(52) U.S. Cl.
CPC .................. *B66C 1/36* (2013.01); *B64D 1/22* (2013.01); *B64C 27/00* (2013.01)

(58) Field of Classification Search
CPC .... B66C 1/36; B64D 1/22; B64D 1/12; B64C 27/00
See application file for complete search history.

(56) References Cited

U.S. PATENT DOCUMENTS

| 1,408,940 A | 3/1922 | Harley |
| 3,444,569 A | 5/1969 | Greenberg et al. |
| (Continued) | | |

FOREIGN PATENT DOCUMENTS

| CN | 205114816 U | 3/2016 |
| CN | 108673550 A | 10/2018 |
| (Continued) | | |

OTHER PUBLICATIONS

Notice of Reasons for Rejection for Japanese Application No. JP 2022-171338, Completed by the Japanese Patent Office, Dated Jan. 29, 2024, 6 pages (including English translation).

(Continued)

*Primary Examiner* — Alentina Xavier
(74) *Attorney, Agent, or Firm* — BROOKS KUSHMAN P.C.

(57) ABSTRACT

A human and/or non-human cargo attachment device for a rotorcraft. The device comprises a mounting interface with a carrier device and an attachment that is rigidly mounted to the carrier device for attachment to a rotorcraft rope or cable. A device body is mounted to the carrier device. The device body has a stationary body section and a movable body section. The stationary body section is stationarily arranged on the carrier device and comprises a plurality of rotatable attachment hooks for attachment of human or non-human external cargo. The movable body section is movably arranged on the carrier device for enabling movements of the movable body section relative to the stationary body section between a locking position and a release position.

20 Claims, 5 Drawing Sheets

(56) References Cited

U.S. PATENT DOCUMENTS

| | | |
|---|---|---|
| 3,467,346 A | 9/1969 | Carson |
| 3,476,339 A | 11/1969 | Pugh |
| 5,836,548 A | 11/1998 | Dietz et al. |
| 6,336,260 B1 | 1/2002 | Mauthner |
| 6,598,831 B1 | 7/2003 | Tardy |
| 10,398,939 B1 | 9/2019 | Siegel |
| 2005/0250396 A1 | 11/2005 | Hayles |
| 2006/0249330 A1 | 11/2006 | Tardy |
| 2016/0332843 A1* | 11/2016 | Schafer ............ B66C 1/34 |
| 2016/0368605 A1 | 12/2016 | Behrens et al. |
| 2021/0047149 A1 | 2/2021 | McKay |

FOREIGN PATENT DOCUMENTS

| | | |
|---|---|---|
| CN | 112047228 A | 12/2020 |
| EP | 1100720 A1 | 5/2001 |
| EP | 1646562 A1 | 4/2006 |
| EP | 3037133 B1 | 6/2018 |
| EP | 3781480 A1 | 2/2021 |
| GB | 2340101 B | 2/2002 |
| JP | 2014118251 A | 6/2014 |
| WO | 0007877 A1 | 2/2000 |
| WO | 2005005253 A1 | 1/2005 |
| WO | 2010073033 A1 | 7/2010 |
| WO | 2019204405 A1 | 10/2019 |

OTHER PUBLICATIONS

Notice of Reasons for Rejection for Japanese Application No. JP 2022-171338, Completed by the Japanese Patent Office, Dated Nov. 15, 2023, 9 pages (including English translation).

European Search Report for European Application No. EP 21400024.2, Completed by the European Patent Office, Dated May 5, 2022, 6 pages.

\* cited by examiner

HUMAN AND/OR NON-HUMAN CARGO ATTACHMENT DEVICE FOR USE WITH A ROTORCRAFT

CROSS-REFERENCE TO RELATED APPLICATIONS

This application claims priority to European patent application No. EP 21400024.2 filed on Dec. 15, 2021, the disclosure of which is incorporated in its entirety by reference herein.

TECHNICAL FIELD

The present disclosure is related to a human and/or non-human cargo attachment device for use with a rotorcraft, which is embodied to permit transport of human and/or non-human external cargo outside of the rotorcraft.

BACKGROUND

Non-human cargo attachment devices for use with a rotorcraft, which are embodied to permit transport of non-human external cargo outside of the rotorcraft, may be provided in the form of hooks that are attached to ropes or cables which are connected to the rotorcraft. Such hooks may be embodied as simple hooks, safety hooks, snap hooks, or even more complicated forms of hooks. For instance, the document EP 3 781 480 A1 describes a perforated capsule hook with a perforated housing which is attachable to non-human external cargo and remains after retraction from the non-human external cargo in a comparatively stable state during high speed flight due to a plurality of holes and perforations provided in the perforated housing.

Furthermore, human and/or non-human cargo attachment devices for use with a rotorcraft, which are embodied to permit transport of human and/or non-human external cargo outside of the rotorcraft, are available in a wide range of variations and usually attachable to ropes or cables which are connected to the rotorcraft. More generally, in civil, parapublic and military missions, such ropes or cables with human and/or non-human cargo attachment devices may e.g., be used for rapidly inserting and/or extracting persons and/or cargo into/from various environments, in particular environments that do not permit landing of the rotorcraft. Such environments may e.g., include maritime environments such as offshore as well as oil and gas platforms, and terrestrial environments such as land in vegetated areas, mountains and urban territory.

In general, three different types of human and/or non-human cargo attachment devices are currently available: rigging plates or loops of so-called SPIE (Special Patrol Insertion/Extraction) rigs, personal transport nets, and personal transport platforms, all of which are attachable to associated attachment interfaces such as safety hooks or snap hooks provided at associated ropes or cables of a given rotorcraft.

More specifically, in SPIE rigs the rigging plates or loops may be distributed over the length of associated ropes in order to form lashing points for attachment of human or non-human cargo. By way of example, the documents CN 112 047 228 A, CN 205 114 816 U, EP 3 037 133 B1, GB 2 340 101 B, and U.S. Pat. No. 1,408,940 A describe illustrative ropes with rigging plates or loops that form lashing points. Other rigging plates which are configured to provide multiple lashing points and which are attachable to attachment interfaces provided at associated ropes or cables are e.g., described in the documents US 2021/0047149 A1, U.S. Pat. No. 10,398,939 B1, and U.S. Pat. No. 6,336,260 B1. Documents CN108673550, US2016368605 and U.S. Pat. No. 5,836,548 were cited.

Personal transport nets, in turn, are available in a wide range of variations, as e.g., acknowledged in the document WO 2010/073033 A1, which describes that helicopter under-slung load equipment nets are well-known and widely used for transporting goods by helicopter either when there is no room in the helicopter for the goods, or when for reasons of speed or efficiency it is preferred to keep the goods outside of the helicopter. More specifically, such helicopter under-slung load equipment nets usually consist of a braided nylon net body and a plurality of lifting loops made from nylon webbing. Furthermore, each net usually comprises four pairs of lifting loops and each pair of lifting loops is provided with a hook.

Similarly, personal transport platforms are also available in a wide range of variations and e.g., described in the documents U.S. Pat. Nos. 3,476,339 A, 3,467,346 A, 3,444, 569 A, US 2005/0250396 A1, EP 1 646 562 A1, and EP 1 100 720 A1. By way of example, the document EP 1 100 720 A1 describes a personal transport platform that may be suspended from a rotorcraft for rescuing people or equipment and that forms a link between the rotorcraft and a pod capable of being folded and unfolded, which is formed by a frame associated with a flexible support, such as a net. The frame comprises, fixed to the link, a central mast connected to mobile means bearing the flexible support, for folding and unfolding the mobile means and the flexible support about the central mast.

However, none of the above-described human and/or non-human cargo attachment devices is suitable for use with a rotorcraft for inserting and/or extracting persons and/or cargo into/from forested areas.

SUMMARY

It is, therefore, an object of the present disclosure to provide a new human and/or non-human cargo attachment device which is suitable for use with a rotorcraft for inserting and/or extracting persons and/or cargo into/from forested areas.

This object is solved by a human and/or non-human cargo attachment device for use with a rotorcraft, which comprises the features of claim 1. More specifically, according to the present disclosure a human and/or non-human cargo attachment device for use with a rotorcraft comprises a mounting interface with a carrier device and an attachment that is rigidly mounted to the carrier device for attachment to a rotorcraft rope or cable, and a device body that is mounted to the carrier device and that comprises a stationary body section and a movable body section. The stationary body section is stationarily arranged on the carrier device and comprises a plurality of rotatable attachment hooks for attachment of human or non-human external cargo, wherein attached human or non-human external cargo is locked on the device body in closed state of the plurality of rotatable attachment hooks and releasable from the device body in opened state of the plurality of rotatable attachment hooks. The movable body section is movably arranged on the carrier device for enabling movements of the movable body section relative to the stationary body section between a locking position and a release position, wherein the plurality of rotatable attachment hooks is rotatable from the closed state to the opened state via movement of the movable body section from the locking position to the release position, and wherein the plurality of rotatable attachment hooks is rotatable from the opened state to the closed state via movement of the movable body section from the release position to the locking position.

Advantageously, the inventive human and/or non-human cargo attachment device is suitable for use with a rotorcraft in forested areas and enables a fast and simple insertion/extraction of up to ten or even more persons into/from such forested areas, as well as any other potential application environment. A safe and secure use in forested areas is amongst others enabled by forming a respective device body of the human and/or non-human cargo attachment device with a dedicated penetrating design, preferably with an arrowhead shape.

Preferably, the device body is lightweight and weighs only approximately 7 kg while allowing at least transportation of up to ten persons, each having a weight of up to 150 kg. More specifically, the device body forms a single, compact and central point for insertion/extraction, which allows for interaction of transported persons during transportation. In particular, lifting and drop-off of transported persons and/or cargo in a single step is enabled. Furthermore, the device body is preferably embodied with a redundant design and provides for each rotatable attachment hook at least one additional lashing point for attachment of human external cargo.

In addition, a required floatability of the star-shaped device body may be improved by filling its interior with foam. Furthermore, additional floats can be attached to the star-shaped device body, e.g., at selected rotatable attachment hooks. More specifically, any interior chambers of the device body may be filled with foam to achieve an increased floatability which is required to enable application in sea insertion/extraction.

In an illustrative realization the human and/or non-human cargo attachment device comprises a star-shaped device body with e.g., ten rotatable attachment hooks, each forming a respective main lashing point for attachment of human or non-human external cargo. Each such main lashing point may be associated with a redundant lashing point with enough distance between them in order to avoid snap hook respectively carabiner interactions. The e.g., ten main lashing points, i.e., the rotatable attachment hooks, are preferably provided at lateral support arms of the device body in order to transmit occurring lateral loads. Preferably, the star-shaped device body exhibits an arrowhead form in order to be able to penetrate e.g., through trees in forested areas. The star-shaped device body may preferably be attached to a rope or cable of a rotorcraft by means of a suitable load hook. The rotatable attachment hooks of the star-shaped device body may be opened or closed either all at the same time or in at least two separate groups, e.g., in two groups of five rotatable attachment hooks. The opening of the rotatable attachment hooks of each such group is preferably initiated by a movement of a respectively associated movable body section away from the stationary body section into a release position. In locking position of the respectively associated movable body section, the latter preferably forms a form-fit locking with the rotatable attachment hooks, e.g., by means of pin/safety bolts sticking into recesses/holes in the rotatable attachment hooks. By moving the respectively associated movable body section away from the stationary body section, the form-fit locking is released and the rotatable attachment hooks are opened by rotating outward by means of an associated lever mechanism. To close the rotatable attachment hooks, the respectively associated movable body section is moved toward the stationary body section.

According to some aspects, the stationary body section comprises a plurality of lateral support arms, wherein each rotatable attachment hook of the plurality of rotatable attachment hooks is rotatably supported at an associated lateral support arm of the plurality of lateral support arms.

According to some aspects, the stationary body section comprises a sleeve-shaped carrier which is mounted to the carrier device, wherein the sleeve-shaped carrier and the lateral support arms of the plurality of lateral support arms form a star-shaped arrangement in radial direction of the device body.

According to some aspects, each lateral support arm of the plurality of lateral support arms comprises a fork-shaped accommodation to which an associated pivot bearing of a plurality of pivot bearings is mounted, wherein each fork-shaped accommodation rotatably accommodates an associated rotatable attachment hook of the plurality of rotatable attachment hooks.

According to some aspects, each rotatable attachment hook of the plurality of rotatable attachment hooks forms a main lashing point, wherein each lateral support arm of the plurality of lateral support arms comprises a redundant lashing point of a plurality of redundant lashing points.

According to some aspects, each rotatable attachment hook of the plurality of rotatable attachment hooks comprises an actuatable extension that is actuatable by means of the movable body section for rotation of the rotatable attachment hook from the closed state to the opened state.

According to some aspects, each rotatable attachment hook of the plurality of rotatable attachment hooks comprises at least one blockable surface that is blockable by means of the movable body section to prevent rotation of the rotatable attachment hook.

According to some aspects, the movable body section comprises a plurality of lateral blocking arms, wherein each lateral blocking arm of the plurality of lateral blocking arms is provided for blocking an associated rotatable attachment hook of the plurality of rotatable attachment hooks in the closed state.

According to some aspects, the movable body section comprises at least one slidable carrier sleeve which is slidably supported on the carrier device, wherein the slidable carrier sleeve and the lateral blocking arms of the plurality of lateral blocking arms form a star-shaped arrangement in radial direction of the device body.

According to some aspects, the at least one slidable carrier sleeve comprises at least a first slidable carrier sleeve section and a second slidable carrier sleeve section, wherein a first predetermined number of the lateral blocking arms of the plurality of lateral blocking arms is connected to the first slidable carrier sleeve section, wherein a second predetermined number of the lateral blocking arms of the plurality of lateral blocking arms is connected to the second slidable carrier sleeve section, and wherein the first and second carrier sleeve sections are slidable on the carrier device independent of each other.

According to some aspects, each lateral blocking arm of the plurality of lateral blocking arms comprises a lock pin that is adapted to form a form-fit connection with an associated lock hole provided on the associated rotatable attachment hook of the plurality of rotatable attachment hooks in the closed state.

According to some aspects, each lateral blocking arm of the plurality of lateral blocking arms comprises an actuating pin that is adapted to cause rotation of the associated rotatable attachment hook of the plurality of rotatable attachment hooks from the closed state to the opened state via movement of the movable body section from the locking position to the release position.

According to some aspects, the movable body section is blockable in the locking position on the carrier device via associated blocking and securing means.

According to some aspects, the carrier device comprises a support end flange, wherein the stationary body section abuts on the support end flange.

According to some aspects, the device body comprises an arrowhead-shaped form.

BRIEF DESCRIPTION OF THE DRAWINGS

Preferred embodiments of the disclosure are outlined by way of example in the following description with reference to the attached drawings. In these attached drawings, identical or identically functioning components and elements are labelled with identical reference numbers and characters and are, consequently, only described once in the following description.

DETAILED DESCRIPTION

Figure 1:
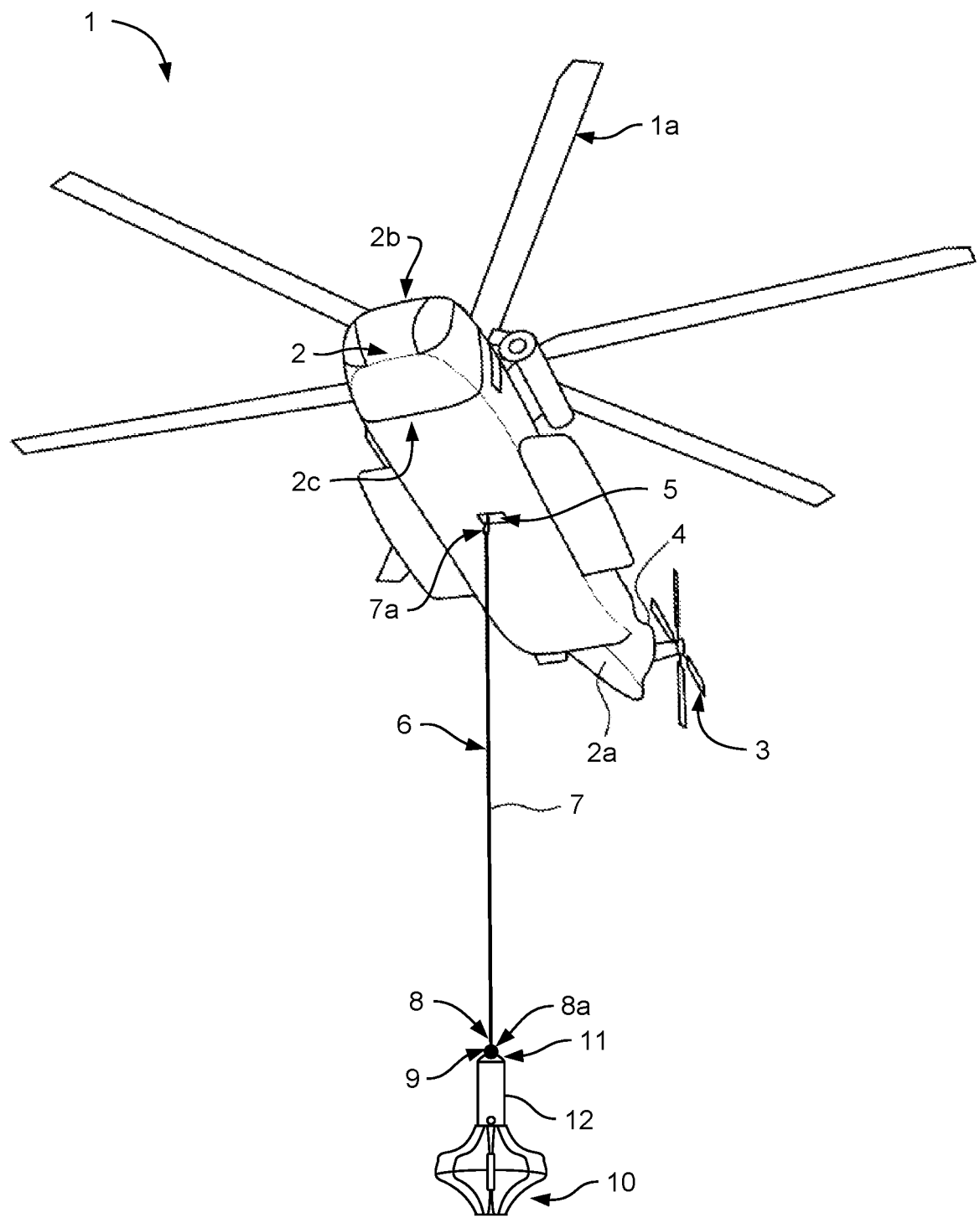
FIG. 1 shows a perspective view of a rotorcraft with a human and/or non-human cargo attachment device according to the present disclosure.

FIG. 1 shows a rotorcraft 1 that illustratively comprises a fuselage 2 with a bottom shell 2c. By way of example, the fuselage 2 forms a cabin 2b for passengers and/or cargo and a tail boom 2a is mounted to the fuselage 2.

The rotorcraft 1 illustratively further comprises at least one main rotor 1a configured to provide lift and forward or backward thrust during operation, and at least one counter-torque device 3 configured to provide counter-torque during operation, i.e., to counter the torque created by rotation of the at least one main rotor 1a for purposes of balancing the rotorcraft 1 in terms of yaw.

The at least one counter-torque device 3 is illustratively provided at an aft section of the tail boom 2a, which preferably further comprises a fin 4. However, it should be noted that the at least one counter-torque device 3, as well as the fin 4 provided at the aft section of the tail boom 2a, are merely described for illustrating one possible realization of the rotorcraft 1.

According to one aspect, the rotorcraft 1 is provided with human and/or non-human cargo insertion/extraction means 6. By way of example, the human and/or non-human cargo insertion/extraction means 6 are attached to an associated attachment 5 provided at the bottom shell 2c. The attachment 5 is illustratively embodied as an attachment ring which may e.g., be connected to a cable that is coupled to a winch.

More specifically, the human and/or non-human cargo insertion/extraction means 6 preferably comprises a rope 7 with a rope interface 7a, such as an eyelet, which is illustratively attached to the attachment 5, e.g., by means of a snap hook respectively carabiner. The rope 7 is preferably provided with an attachment interface 8, such as a safety hook or snap hook respectively carabiner 8a. The attachment interface 8 is preferably provided to enable a secure and reliable attachment of external components to the rope 7. In a variant, the rope 7 is replaced by a cable.

By way of example, an attachment 9 of a human and/or non-human cargo attachment device 10 is attached to the attachment interface 8. Illustratively, the attachment 9 is mounted to the human and/or non-human cargo attachment device 10 at an associated mounting interface 11 provided at a carrier device 12 of the human and/or non-human cargo attachment device 10. The attachment 9 may be implemented by means of a load hook (9a in FIG. 2). The human and/or non-human cargo attachment device 10 and/or its constituent components are further described below with reference to FIG. 2 to FIG. 5.

Illustratively, the rotorcraft 1 with the human and/or non-human cargo insertion/extraction means 6 is shown in operation. In this illustrative operation, the human and/or non-human cargo insertion/extraction means 6 may e.g., be used for inserting/extracting persons, i.e., human cargo, and/or goods and loads, i.e., non-human cargo, into/from a respective environment.

By way of example, the rotorcraft 1 is embodied as a helicopter. However, use of the human and/or non-human cargo insertion/extraction means 6 is not limited to use with a helicopter. Instead, the human and/or non-human cargo insertion/extraction means 6 may at least be used with other rotorcrafts, such as e.g., tiltrotor aircrafts, compound helicopters, multicopters and so on.

Figure 2:
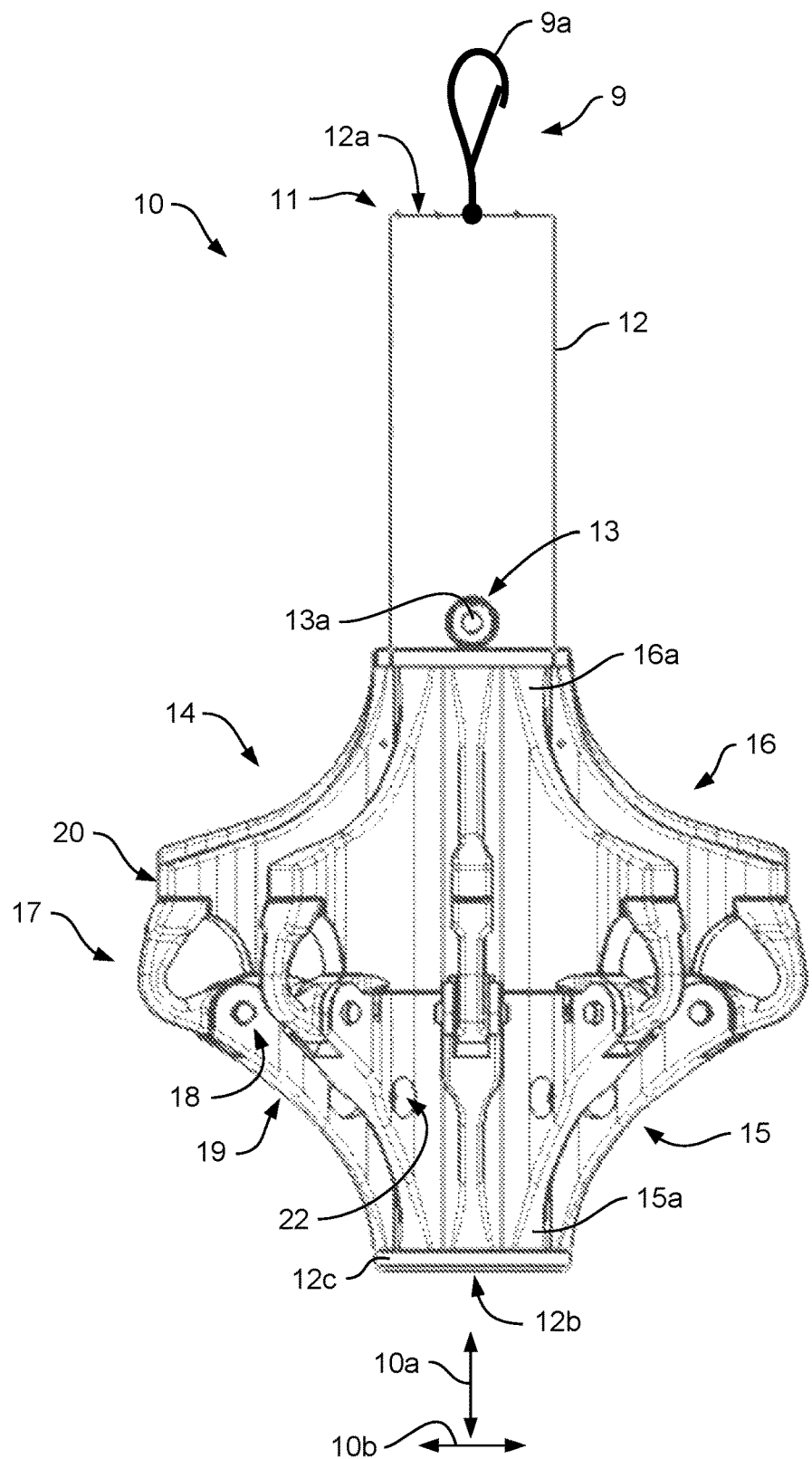
FIG. 2 shows a front view of a device body and a carrier device of the human and/or non-human cargo attachment device of FIG. 1.

FIG. 2 shows the human and/or non-human cargo attachment device 10 with the attachment 9, the mounting interface 11, and the carrier device 12 of FIG. 1. For simplicity and brevity, the human and/or non-human cargo attachment device 10 is hereinafter merely referred to as the "cargo attachment device 10".

The mounting interface 11 is illustratively embodied at a first upper—end 12a (FIG. 2) of the carrier device 12 and provided with the attachment 9 for attachment to a rotorcraft rope or cable via a suitable attachment interface, e.g., the attachment interface 8 provided at the rotorcraft rope 7 of FIG. 1. Illustratively, the attachment 9 includes a load hook 9a that is rigidly mounted to the carrier device 12 for attachment to the suitable attachment interface, e.g., the attachment interface 8 provided at the rotorcraft rope 7 of FIG. 1.

Illustratively, the carrier device 12 is connected to a device body 14. The device body 14 may be formed in the shape of an arrowhead, as illustrated. Such an arrowhead-shaped form provides for a penetrating design, which is particularly advantageous for use of the cargo attachment device 10 in forested areas, as it enables the device body 14 to penetrate through the trees in the forested areas with minimal resistance.

More specifically, the device body 14 is mounted to the carrier device 12 and preferably comprises a stationary body section 15 and a movable body section 16. Illustratively, the carrier device 12 is provided at a second lower-end 12b (FIG. 2) with a support end flange 12c and the stationary body section 15 abuts on the support end flange 12c.

The stationary body section 15 is preferably stationarily arranged on the carrier device 12. In other words, the stationary body section 15 is not movable relative to the carrier device 12, at least not in a direction in which the movable body section 16 is movable, as described by way of example below.

More particularly, the stationary body section 15 preferably comprises a sleeve-shaped carrier 15a which is mounted to the carrier device 12 which is preferably sleeve or cylinder-shaped. If desired, the stationary body section 15 may be rigidly attached to the carrier device 12 and/or the support end flange 12c by any suitable means, such as suitable fasteners, a press-fit connection and/or a welding connection, and so on. Alternatively, or in addition, the stationary body section 15 may be an integral part of the carrier device 12.

Illustratively, the stationary body section 15 of the device body 14 comprises a plurality of rotatable attachment hooks 17 for attachment of human or non-human external cargo. Preferably, any attached human or non-human external cargo is locked on the device body 14 in closed state of the plurality of rotatable attachment hooks 17 and releasable from the device body 14 in opened state of the plurality of rotatable attachment hooks 17. By way of example, the plurality of rotatable attachment hooks 17 is shown in closed state in FIG. 2.

Illustratively, the stationary body section 15 comprises a plurality of lateral support arms 19. Preferably, the plurality of lateral support arms 19 is provided with a plurality of pivot bearings 18 which rotatably accommodates the plurality of rotatable attachment hooks 17. By way of example, the plurality of lateral support arms 19 is rigidly mounted to, or integrally formed with, the sleeve-shaped carrier 15a of the stationary body section 15 such that the sleeve-shaped carrier 15a and the plurality of lateral support arms 19 form a star-shaped arrangement in radial direction 10b of the device body 14.

Preferably, the plurality of rotatable attachment hooks 17 forms a plurality of main lashing points at the plurality of lateral support arms 19, which is preferentially further provided with a plurality of redundant lashing points 22. Use of main lashing points and redundant lashing points may be required for attachment of human external cargo at the device body 14.

According to one aspect, opening and closing of the plurality of rotatable attachment hooks 17 is performed by means of the movable body section 16 of the device body 14. More specifically, the movable body section 16 is preferably movably arranged on the carrier device 12 for enabling movements of the movable body section 16 relative to the stationary body section 15 between a locking position, illustrated in FIG. 2, and a release position, illustrated in FIG. 3. The plurality of rotatable attachment hooks 17 is preferably rotatable from the closed state to the opened state via movement of the movable body section 16 from the locking position to the release position, and the plurality of rotatable attachment hooks 17 is preferably rotatable from the opened state to the closed state via movement of the movable body section 16 from the release position to the locking position.

By way of example, suitable movements of the movable body section 16 are performed in height direction 10a of the device body 14. More specifically, the movable body section 16 preferably includes at least one slidable carrier sleeve 16a which is slidably supported on the carrier device 12 such that the suitable movements are performed by gliding of the at least one slidable carrier sleeve 16a along the carrier device 12 which is preferably sleeve or cylinder-shaped, in the height direction 10a.

Preferably, the movable body section 16 is blockable in the locking position on the carrier device 12 via associated blocking and securing means 13. By way of example, the associated blocking and securing means 13 comprise at least one lock pin 13a.

Illustratively, the movable body section 16 comprises a plurality of lateral blocking arms 20. The plurality of lateral blocking arms 20 is preferably provided for blocking of the plurality of rotatable attachment hooks 17 in the closed state. By way of example, the plurality of lateral blocking arms 20 forms a star-shaped arrangement with the slidable carrier sleeve 16a of the movable body section 16 in the radial direction 10b of the device body 14. Preferably, the plurality of lateral blocking arms 20 is rigidly mounted to, or integrally formed with, the slidable carrier sleeve 16a of the movable body section 16.

Figure 3:
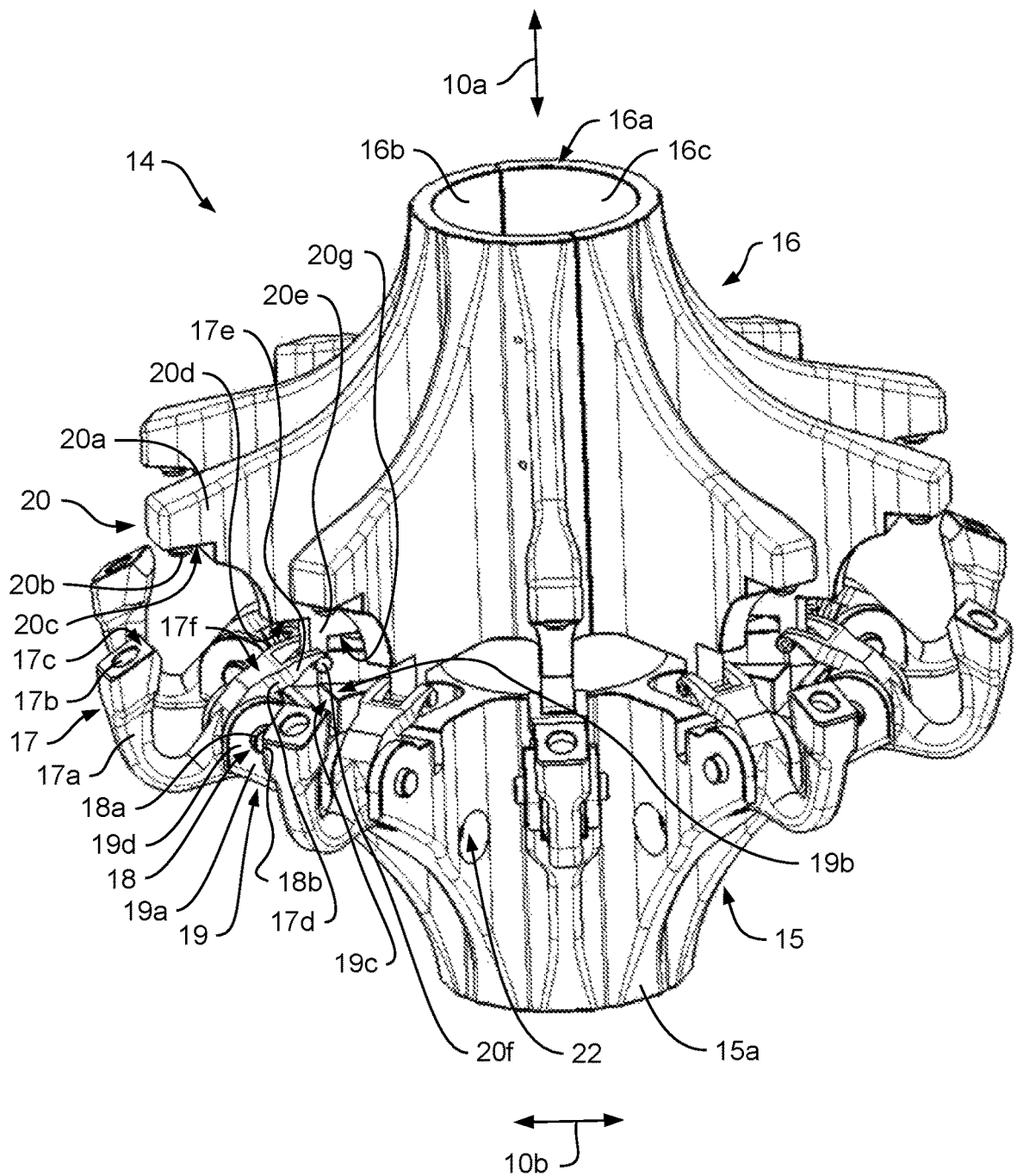
FIG. 3 shows a perspective view of the device body of the human and/or non-human cargo attachment device of FIG. 2.

FIG. 3 shows the device body 14 with the stationary body section 15 and the movable body section 16 of FIG. 2, wherein the movable body section 16 is illustrated in the release position. The stationary body section 15 comprises the sleeve-shaped carrier 15a and the plurality of lateral support arms 19 with the plurality of pivot bearings 18 which rotatably accommodates the plurality of rotatable attachment hooks 17 forming the main lashing points, as well as with the plurality of redundant lashing points 22. The movable body section 16 comprises the slidable carrier sleeve 16a and the plurality of lateral blocking arms 20.

According to one aspect, the slidable carrier sleeve 16a is embodied by a first slidable carrier sleeve section 16b and a second slidable carrier sleeve section 16c. Preferably, the first slidable carrier sleeve section 16b and the second slidable carrier sleeve section 16c are slidable on the carrier device 12 independent of each other.

The first slidable carrier sleeve section 16b may be connected to a first predetermined number of lateral blocking arms of the plurality of lateral blocking arms 20 of the movable body section 16, and the second slidable carrier sleeve section 16c may be connected to a second predetermined number of lateral blocking arms of the plurality of lateral blocking arms 20. Illustratively, the first and second slidable carrier sleeves 16b, 16c are formed as slidable carrier sleeve halves. Thus, by way of example, one half of the lateral blocking arms of the plurality of lateral blocking arms 20 is connected to one of the slidable carrier sleeve halves 16b, 16c, while the other half of the lateral blocking arms of the plurality of lateral blocking arms 20 is connected to the other one of the slidable carrier sleeve halves 16c, 16b.

For simplicity and clarity of the drawing, only a single lateral blocking arm of the plurality of lateral blocking arms 20 is separately labelled with the reference sign 20a. Likewise, only a single lateral support arm of the plurality of lateral support arms 19 is separately labelled with the reference sign 19a, only a single pivot bearing of the plurality of pivot bearings 18 is separately labelled with the reference sign 18a, and only a single rotatable attachment hook of the plurality of rotatable attachment hooks 17 is separately labelled with the reference sign 17a. The single rotatable attachment hook 17a, the single pivot bearing 18a, the single lateral support arm 19a, and the single lateral blocking arm 20a are described in more detail hereinafter representative for the plurality of rotatable attachment hooks 17, the plurality of pivot bearings 18, the plurality of lateral support arms 19, and the plurality of lateral blocking arms 20, for simplicity and clarity of the description.

More specifically, the lateral support arm 19a preferably comprises an upper mechanical stop 19b and a receiving groove 19c. Furthermore, the lateral support arm 19a illustratively comprises a fork-shaped accommodation 19d to which the pivot bearing 18a is mounted. By way of example, the pivot bearing 18a is embodied by means of a bearing pin 18b which is rigidly attached in the fork-shaped accommodation 19d. The fork-shaped accommodation 19d illustratively accommodates the rotatable attachment hook 17a rotatably. To this end, the rotatable attachment hook 17a may be mounted rotatably on the bearing pin 18b. Alternatively, the bearing pin 18b may be rotatable in the fork-shaped accommodation 19d and the rotatable attachment hook 17a may be mounted rigidly to the bearing pin 18b.

Preferably, the rotatable attachment hook 17a comprises a lock hole 17b provided on a blockable surface 17c. Furthermore, the rotatable attachment hook 17a is preferably embodied with an inner extension 17d, which may be provided with an actuatable extension 17e. The actuatable extension 17e is illustratively fork-shaped. The inner extension 17d may further be provided with a blockable surface 17f. Preferably, at least one of the blockable surfaces 17c, 17f is blockable by means of the movable body section 16 to prevent rotation of the rotatable attachment hook 17a.

By way of example, the rotatable attachment hook 17a is blockable in closed state, illustrated in FIG. 2, by means of the lateral blocking arm 20a. More specifically, the lateral blocking arm 20a is preferably embodied with an outer blocking surface 20c and an inner blocking surface 20d. The outer blocking surface 20c may be adapted for blocking of the blockable surface 17c of the rotatable attachment hook 17a, and the inner blocking surface 20d may be adapted for blocking of the blockable surface 17f of the rotatable attachment hook 17a.

Illustratively, the outer blocking surface 20c of the lateral blocking arm 20a is embodied with a lock pin 20b. The lock pin 20b may be provided to form a form-fit connection with the lock hole 17b of the rotatable attachment hook 17a in the closed state of the rotatable attachment hook 17a.

The lateral blocking arm 20a preferably further comprises an actuating pin 20f that is adapted to cause rotation of the rotatable attachment hook 17a from the closed state to the opened state via movement of the movable body section 16 from the locking position, illustrated in FIG. 2, to the release position, illustrated in FIG. 3. Illustratively, the actuating pin 20f is arranged on at least one end, and, by way of example, on both sides of a lower extension 20e provided on the movable body section 16 such that the actuating pin 20f is located—in FIG. 3—below the actuatable fork 17e of the rotatable attachment hook 17a. Preferably, the actuatable fork 17e is actuatable by means of the movable body section 16, i.e., the actuating pin 20f, for rotation of the rotatable attachment hook 17a from the closed state to the opened state.

Finally, the lateral blocking arm 20g may comprise a mechanical stop 20g. The mechanical stop 20g may be provided to abut against the stationary body section 15 in the closed state of the rotatable attachment hook 17a.

Figure 4:
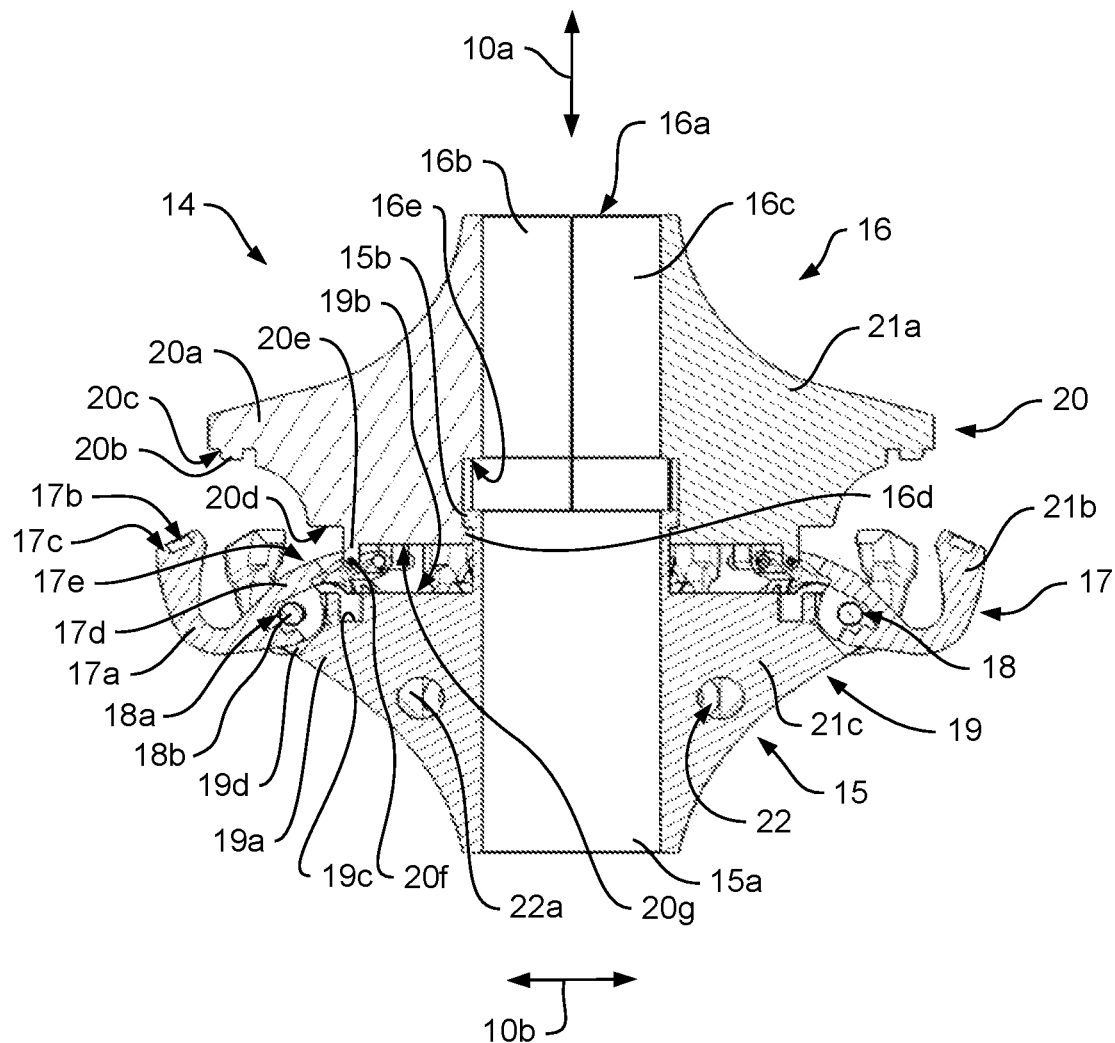
FIG. 4 shows a first sectional view of the device body of FIG. 2 and FIG. 3.

FIG. 4 shows the device body 14 with the stationary body section 15 and the movable body section 16 of FIG. 2 and FIG. 3, wherein the movable body section 16 is illustrated in the release position. The stationary body section 15 comprises the sleeve-shaped carrier 15a and the plurality of lateral support arms 19 with the plurality of pivot bearings 18 which rotatably accommodates the plurality of rotatable attachment hooks 17 forming the main lashing points, as well as with the plurality of redundant lashing points 22. More specifically, the stationary body section 15 comprises the rotatable attachment hook 17a which is rotatably mounted by means of the pivot bearing 18a to the lateral support arm 19a. The movable body section 16 comprises the slidable carrier sleeve 16a with the slidable carrier sleeve halves 16b, 16c, and the plurality of lateral blocking arms 20. More specifically, the movable body section 16 comprises the lateral blocking arm 20a.

By way of example and for purposes of illustration, an additional lateral blocking arm of the plurality of lateral blocking arms 20 is separately labelled with the reference sign 21a, an additional lateral support arm of the plurality of lateral support arms 19 is separately labelled with the reference sign 21c, and an additional rotatable attachment hook of the plurality of rotatable attachment hooks 17 is separately labelled with the reference sign 21b. Furthermore, a single redundant lashing point of the plurality of redundant lashing points 22 is individually, illustratively and representatively labelled with the reference sign 22a.

FIG. 4 further details an illustrative realization of the lateral blocking arm 20a with the outer blocking surface 20c that comprises the lock pin 20b, the inner blocking surface 20d, the lower extension 20e, the actuating pin 20f, and the mechanical stop 20g, as well as of the lateral support arm 19a with the upper mechanical stop 19b, the receiving groove 19c, and the fork-shaped accommodation 19d that rotatably accommodates the rotatable attachment hook 17a. FIG. 4 also further details an illustrative realization of the rotatable attachment hook 17a with the lock hole 17b on the blockable surface 17c, and the inner extension 17d with the actuatable extension 17e and the blockable surface 17f.

Illustratively, the inner extension 17d is engaged with the actuating pin 20f such that the rotatable attachment hook 17a is rotated into its opened state via movement of the movable body section 16 away from the stationary body section 15 in the height direction 10a of the device body 14 from the locking position, according to FIG. 2, into the illustrated release position, according to FIG. 3. In this release position, the movable body section 16 is preferably blocked by the stationary body section 15, as described hereinafter, to prevent any further movement of the movable body section 16 away from the stationary body section 15.

Illustratively, the movable body section 16 comprises a lower—inner shoulder 16d (FIG. 4) and the stationary body section 15 comprises an upper—outer collar 15b (FIG. 4). The lower inner shoulder 16d preferably abuts against the upper outer collar 15b in the release position such that any further movement of the movable body section 16 in the height direction 10a away from the stationary body section 15 is prevented.

By way of example, the movable body section 16 further comprises an end stop 16e. Preferably, the end stop 16e abuts against the upper outer collar 15b in the locking position such that any further movement of the movable body section 16 in the height direction 10a toward the stationary body section 15 is prevented.

Figure 5:
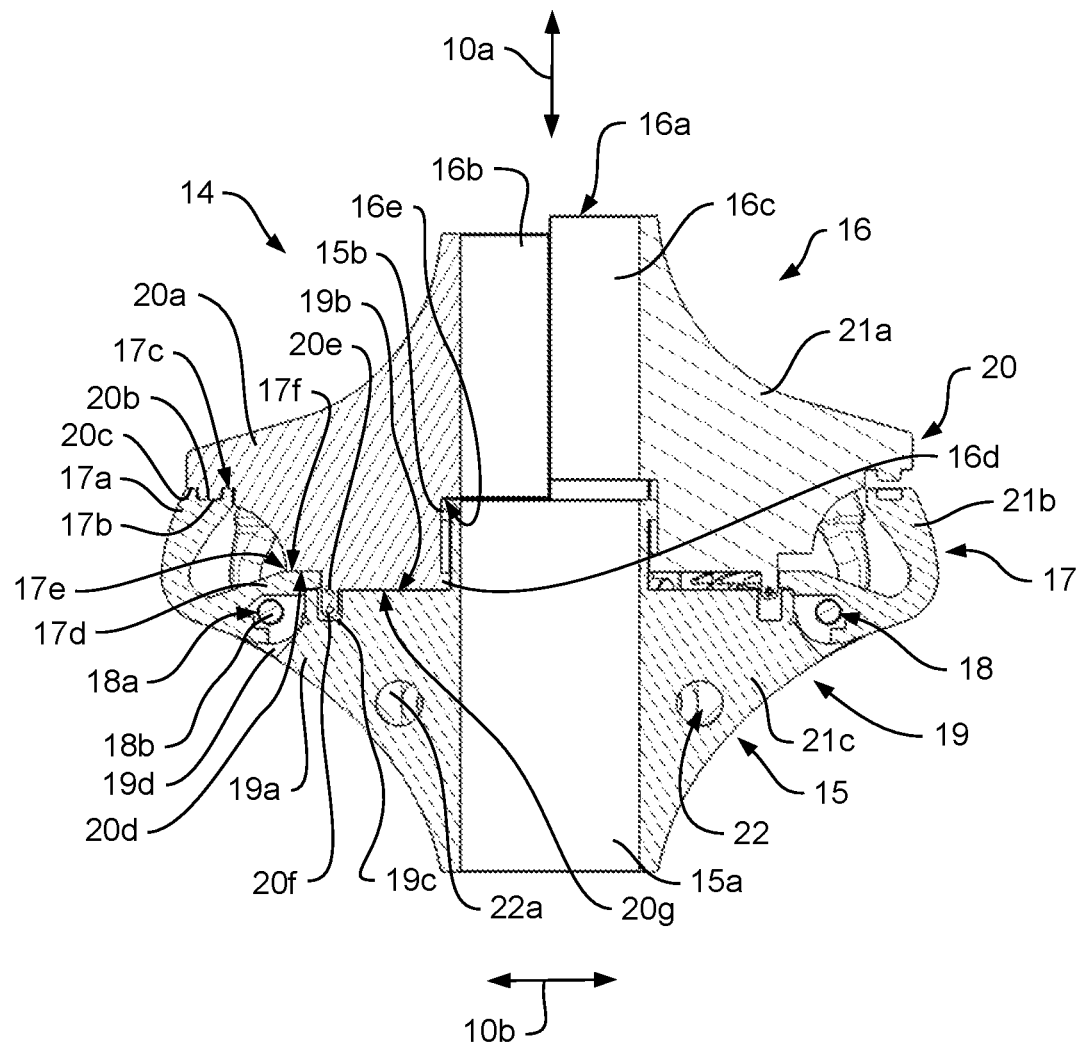
FIG. 5 shows a second sectional view of the device body of FIG. 2 and FIG. 3.

FIG. 5 shows the device body 14 with the stationary body section 15 and the movable body section 16 of FIG. 2 to FIG. 4, wherein the movable body section 16 is partly illustrated in the locking position, and partly in an intermediate position. The stationary body section 15 comprises the sleeve-shaped carrier 15a and the plurality of lateral support arms 19 with the plurality of pivot bearings 18 which rotatably accommodates the plurality of rotatable attachment hooks 17 forming the main lashing points, as well as with the plurality of redundant lashing points 22. More specifically, the stationary body section 15 comprises the rotatable attachment hook 17a which is rotatably mounted by means of the pivot bearing 18a to the lateral support arm 19a. The movable body section 16 comprises the slidable carrier sleeve 16a with the slidable carrier sleeve halves 16b, 16c, and the plurality of lateral blocking arms 20. More specifically, the movable body section 16 comprises the lateral blocking arm 20a.

FIG. 5 further illustrates the lateral blocking arm 20a with the outer blocking surface 20c that comprises the lock pin 20b, the inner blocking surface 20d, the lower extension 20e, the actuating pin 20f, and the mechanical stop 20g, as well as the lateral support arm 19a with the upper mechanical stop 19b, the receiving groove 19c, and the fork-shaped accommodation 19d that rotatably accommodates the rotatable attachment hook 17a. FIG. 5 also further illustrates the rotatable attachment hook 17a with the lock hole 17b on the blockable surface 17c, the inner extension 17d with the actuatable extension 17e and the blockable surface 17f.

In an illustrative operation, by moving the movable body section 16 from the release position illustrated in FIG. 4 in the height direction 10a toward the stationary body section 15, the blocking surface 20d of the lateral blocking arm 20a engages with the blockable surface 17f and, thus, pushes the inner extension 17d of the rotatable attachment hook 17a— in FIG. 5—downward, thus, rotating the rotatable attachment hook 17a about the pivot bearing 18a into the closed state. Movement of the movable body section 16 ends when the mechanical stop 20g of the lateral blocking arm 20 abuts against the mechanical stop 19b of the lateral support arm 19a.

Moreover, FIG. 5 illustrates the lateral blocking arm 21a, the lateral support arm 21c, and the rotatable attachment hook 21b of FIG. 4. Illustratively, the rotatable attachment hook 21b is shown in the intermediate position, wherein the rotatable attachment hook 21b is already rotated into the closed state, but not locked, as illustrated with respect to the rotatable attachment hook 17a.

More specifically, when moving the movable body section 16 from the locking position in the height direction 10a away from the stationary body section 15 toward the release position, initially the form-fit connection between the lock pin 20b and the lock hole 17b must be released to enable a rotation of the rotatable attachment hook 17a. Preferably, only afterwards the actuating pin 20f engages with the inner extension 17d. This is illustrated by way of example representatively with the intermediate position of the rotatable attachment hook 21a.

REFERENCE LIST 1 rotorcraft
1a main rotor
2 fuselage
2a tail boom
2b cabin
2c bottom shell
3 counter-torque device
4 fin
5 rope attachment
6 human and/or non-human cargo insertion/extraction means
7 rope
7a rope interface
8 attachment interface
8a snap hook
9 device attachment
9a load hook
10 human and/or non-human cargo attachment device
10a vertical or height direction
10b horizontal or radial direction
11 mounting interface
12 carrier device
12a upper end of carrier device
12b lower end of carrier device
12c support end flange
13 blocking and securing means
13a lock pin
14 arrowhead-shaped device body
15 stationary lower body section
15a sleeve-shaped carrier
15b upper outer collar
16 movable upper body section
16a slidable carrier sleeve
16b, 16c slidable carrier sleeve halves
16d lower inner shoulder
16e end stop
17 plurality of attachment hooks
17a individual attachment hook
17b lock hole
17c blockable surface
17d inner extension
17e actuatable fork
17f blockable surface
18 plurality of pivot bearings
18a individual pivot bearing
18b bearing pin
19 plurality of lateral support arms
19a individual lateral support arm
19b upper mechanical stop
19c receiving groove
19d fork-shaped accommodation
20 plurality of lateral blocking arms
20a individual lateral blocking arm
20b lock pin
20c outer blocking surface
20d inner blocking surface
20e lower extension
20f actuating pin
20g lower mechanical stop
21a individual lateral blocking arm
21b individual attachment hook
21c individual lateral support arm
22 plurality of redundant lashing points
22a individual redundant lashing point

What is claimed is:

1. A human and/or non-human cargo attachment device for use with a rotorcraft, comprising:
a mounting interface with a carrier device and an attachment that is rigidly mounted to the carrier device for attachment to a rotorcraft rope or cable; and
a device body that is mounted to the carrier device and that comprises a stationary body section and a movable body section,
wherein the stationary body section is stationarily arranged on the carrier device and comprises a plurality of rotatable attachment hooks for attachment of human or non-human external cargo, and wherein attached human or non-human external cargo is locked on the device body in a closed state of the plurality of rotatable attachment hooks and releasable from the device body in an opened state of the plurality of rotatable attachment hooks, and
wherein the movable body section is movably arranged on the carrier device for enabling movements of the movable body section relative to the stationary body section between a locking position and a release position, wherein the plurality of rotatable attachment hooks is rotatable from the closed state to the opened state via movement of the movable body section from the locking position to the release position, wherein the plurality of rotatable attachment hooks is rotatable from the opened state to the closed state via movement of the movable body section from the release position to the locking position;

wherein the movable body section comprises a plurality of lateral blocking arms, and wherein each lateral blocking arm of the plurality of lateral blocking arms is provided for blocking an associated rotatable attachment hook of the plurality of rotatable attachment hooks in the closed state; and wherein the movable body section comprises at least one slidable carrier sleeve which is slidably supported on the carrier device, and wherein the slidable carrier sleeve and the lateral blocking arms of the plurality of lateral blocking arms form a star-shaped arrangement in radial direction of the device body.

2. The human and/or non-human cargo attachment device of claim 1, wherein the stationary body section comprises a plurality of lateral support arms, and wherein each rotatable attachment hook of the plurality of rotatable attachment hooks is rotatably supported at an associated lateral support arm of the plurality of lateral support arms.

3. The human and/or non-human cargo attachment device of claim 2, wherein the stationary body section comprises a sleeve-shaped carrier which is mounted to the carrier device, and wherein the sleeve-shaped carrier and the lateral support arms of the plurality of lateral support arms form a star-shaped arrangement in a radial direction of the device body.

4. The human and/or non-human cargo attachment device of claim 2, wherein each lateral support arm of the plurality of lateral support arms comprises a fork-shaped accommodation to which an associated pivot bearing of a plurality of pivot bearings is mounted, wherein each fork-shaped accommodation rotatably accommodates an associated rotatable attachment hook of the plurality of rotatable attachment hooks.

5. The human and/or non-human cargo attachment device of claim 2, wherein each rotatable attachment hook of the plurality of rotatable attachment hooks forms a main lashing point, and wherein each lateral support arm of the plurality of lateral support arms comprises a redundant lashing point of a plurality of redundant lashing points.

6. The human and/or non-human cargo attachment device of claim 1, wherein each rotatable attachment hook of the plurality of rotatable attachment hooks comprises an actuatable extension that is actuatable by means of the movable body section for rotation of the rotatable attachment hook from the closed state to the opened state.

7. The human and/or non-human cargo attachment device of claim 1, wherein each rotatable attachment hook of the plurality of rotatable attachment hooks comprises at least one blockable surface that is blockable by means of the movable body section to prevent rotation of the rotatable attachment hook.

8. The human and/or non-human cargo attachment device of claim 1, wherein the at least one slidable carrier sleeve comprises at least a first slidable carrier sleeve section and a second slidable carrier sleeve section, wherein a first predetermined number of the lateral blocking arms of the plurality of lateral blocking arms is connected to the first slidable carrier sleeve section, wherein a second predetermined number of the lateral blocking arms of the plurality of lateral blocking arms is connected to the second slidable carrier sleeve section, and wherein the first and second carrier sleeve sections are slidable on the carrier device independent of each other.

9. The human and/or non-human cargo attachment device of claim 1, wherein each lateral blocking arm of the plurality of lateral blocking arms comprises a lock pin that is adapted to form a form-fit connection with an associated lock hole provided on the associated rotatable attachment hook of the plurality of rotatable attachment hooks in the closed state.

10. The human and/or non-human cargo attachment device of claim 1, wherein each lateral blocking arm of the plurality of lateral blocking arms comprises an actuating pin that is adapted to cause rotation of the associated rotatable attachment hook of the plurality of rotatable attachment hooks from the closed state to the opened state via movement of the movable body section from the locking position to the release position.

11. The human and/or non-human cargo attachment device of claim 1, wherein the movable body section is blockable in the locking position on the carrier device via associated blocking and securing means.

12. The human and/or non-human cargo attachment device of claim 1, wherein the carrier device comprises a support end flange, and wherein the stationary body section abuts on the support end flange.

13. The human and/or non-human cargo attachment device of claim 1, wherein the device body comprises an arrowhead-shaped form.

14. A human and/or non-human cargo attachment device for use with a rotorcraft, comprising:
  a mounting interface carrier device and an attachment that is rigidly mounted to the carrier device for attachment to a rotorcraft rope or cable; and
  a device body that is mounted to the carrier device and that comprises a stationary body section and a movable body section,
  wherein the stationary body section is stationarily arranged on the carrier device and comprises a plurality of rotatable attachment hooks for attachment of human or non-human external cargo, and wherein attached human or non-human external cargo is locked on the device body in a closed state of the plurality of rotatable attachment hooks and releasable from the device body in an opened state of the plurality of rotatable attachment hooks, and
  wherein the movable body section is movably arranged on the carrier device for enabling movements of the movable body section relative to the stationary body section between a locking position and a release position, wherein the plurality of rotatable attachment hooks is rotatable from the closed state to the opened state via movement of the movable body section from the locking position the release position, wherein the plurality of rotatable attachment hooks is rotatable from the opened state to the closed state via movement of the movable body section from the release position to the locking position, wherein the movable body section comprises a plurality of lateral blocking arms, and wherein each lateral blocking arm of the plurality of lateral blocking arms is provided with an outer blocking surface that comprises a lock pin, an inner blocking surface, a lower extension, an actuating pin, and a mechanical stop, and wherein a lateral support arm of the plurality of lateral support arms has an upper mechanical stop, a receiving groove, and a fork-shaped accommodation that rotatably accommodates the corresponding rotatable attachment hook.

15. The human and/or non-human cargo attachment device of claim 1, wherein the rotatable attachment hook has a lock hole on a blockable surface, and an inner extension with an actuatable extension and a blockable surface are provided to the rotatable attachment hook.

16. The human and/or non-human cargo attachment device of claim 14, wherein the stationary body section comprises a plurality of lateral support arms, and wherein each rotatable attachment hook of the plurality of rotatable attachment hooks is rotatably supported at an associated lateral support arm of the plurality of lateral support arms.

17. The human and/or non-human cargo attachment device of claim 16, wherein the stationary body section comprises a sleeve-shaped carrier which is mounted to the carrier device, and wherein the sleeve-shaped carrier and the lateral support arms of the plurality of lateral support arms form a star-shaped arrangement in a radial direction of the device body.

18. The human and/or non-human cargo attachment device of claim 16, wherein each lateral support arm of the plurality of lateral support arms comprises a fork-shaped accommodation to which an associated pivot bearing of a plurality of pivot bearings is mounted, wherein each fork-shaped accommodation rotatably accommodates an associated rotatable attachment hook of the plurality of rotatable attachment hooks.

19. The human and/or non-human cargo attachment device of claim 16, wherein each rotatable attachment hook of the plurality of rotatable attachment hooks forms a main lashing point, and wherein each lateral support arm of the plurality of lateral support arms comprises a redundant lashing point of a plurality of redundant lashing points.

20. An attachment device for use with a rotorcraft, comprising:
a mounting interface with a carrier device and an attachment mounted to the carrier device for attachment to a rotorcraft rope or cable; and
a device body mounted to the carrier device and that comprises a stationary body section and a movable body section,
wherein the stationary body section is on the carrier device and comprises a plurality of rotatable attachment hooks for attachment of external cargo, and wherein attached external cargo can be locked on the device body in a closed state of the plurality of rotatable attachment hooks and releasable from the device body in an opened state of the plurality of rotatable attachment hooks, and
wherein the movable body section is movably arranged on the carrier device for enabling movements of the movable body section relative to the stationary body section between a locking position and a release position, wherein the plurality of rotatable attachment hooks is rotatable from the closed state to the opened state via movement of the movable body section from the locking position to the release position, wherein the plurality of rotatable attachment hooks is rotatable from the opened state to the closed state via movement of the movable body section from the release position to the locking position;
wherein the movable body section comprises a plurality of lateral blocking arms, and wherein each lateral blocking arm of the plurality of lateral blocking arms is provided for blocking an associated rotatable attachment hook of the plurality of rotatable attachment hooks in the closed state; and
wherein the movable body section comprises at least one slidable carrier sleeve slidably supported on the carrier device, and wherein the slidable carrier sleeve and the lateral blocking arms of the plurality of lateral blocking arms form a star-shaped arrangement in radial direction of the device body.

* * * * *